April 28, 1970 J. B. FIELDER ET AL 3,509,302
APPARATUS FOR WELDING CIRCUMFERENTIAL SEAMS
Filed Dec. 22, 1966 6 Sheets-Sheet 4

United States Patent Office 3,509,302
Patented Apr. 28, 1970

3,509,302
APPARATUS FOR WELDING CIRCUMFERENTIAL SEAMS
John Bunnell Fielder and Norman Dale Freeman, Dansville, N.Y., assignors to Foster Wheeler Corporation, New York, N.Y., a corporation of New York
Filed Dec. 22, 1966, Ser. No. 603,934
U.S. Cl. 219—60                          15 Claims

ABSTRACT OF THE DISCLOSURE

An apparatus for welding circumferential seams having an elongated member with an electrode means located at one and connected at the other end to a rotatable support assembly with a slot therein to fit over a workpiece. The rotatable support assembly which also has a slot to fit over the workpiece is mounted on a stationary support assembly which is attached to a frame. Shielding gas and electrical energy are conducted through the stationary and rotatable support assemblies.

---

This invention relates to an apparatus for welding circumferential seams between aligned sections of tubing and, more particularly, to the welding of circumferential seams between aligned sections of tubing in a serpentine form such as a superheater.

In modern day vapor generators tube banks are required with extended surface area. The tubes in these tube banks are located closely adjacent one another and are bent back and forth in a serpentine fashion to fit as much surface area as possible within a limited space. One possible technique in manufacturing such a tube bank is to utilize one long continuous length of tubing which may be butt welded when in its straight form and bending it until the desired bank is formed. However, due to the length of the tube involved, it is necessary to have large working area in order to swing around the unbent length. In addition, since each bend is in an opposite direction than the prior bend, it is necessary to move the entire section of tubing for each bend or develop special equipment for right and left bends. Of course, the single length operation is simplified as the entire length can be butt welded when in the straight form thereby greatly simplifying the butt welding apparatus required.

Another alternative is to utilize individual shorter lengths of tubing each having only one bend and then fitting these pieces together to form the desired tube bank. To do this, the tubes must be butt welded when in the form of the tube bank which means that a butt weld must be made on a tube with other tubes very closely located on both sides of the tube being welded. For this reason, it is not possible to rotate the tube and use a stationary welding torch. Obviously, to hand weld each unit by moving around the tube bank is both difficult and expensive. For this reason it can be readily seen that there is a need for an apparatus which can butt weld tubes when in the form of a tube bank. Such an apparatus has the additional advantage of being very valuable for repair work where a section of the tube bank is cut out and replaced.

Therefore, it is an object of this invention to provide an apparatus for welding circumferential seams which requires a very limited space about the tubes in which to operate.

Another object is to provide an apparatus for welding circumferential seams which can be readily and economically operated in both shop and field use.

In accordance with this invention a welding assembly is utilized to fit between two adjacent tubes in a tube bank. Means are provided for rotating this arm about the tubes to be welded. The drive means and welding arm are mounted on a light portable carrier which may optionally be clamped in a simple operation to the two tubes to be welded.

The invention may be better understood from the following detailed description considered in conjunction with the accompanying drawings, in whch:

FIGURE 2 is a cross-sectional view of a portion of the drive assembly and welding assembly of FIG. 1.

Figure 1:
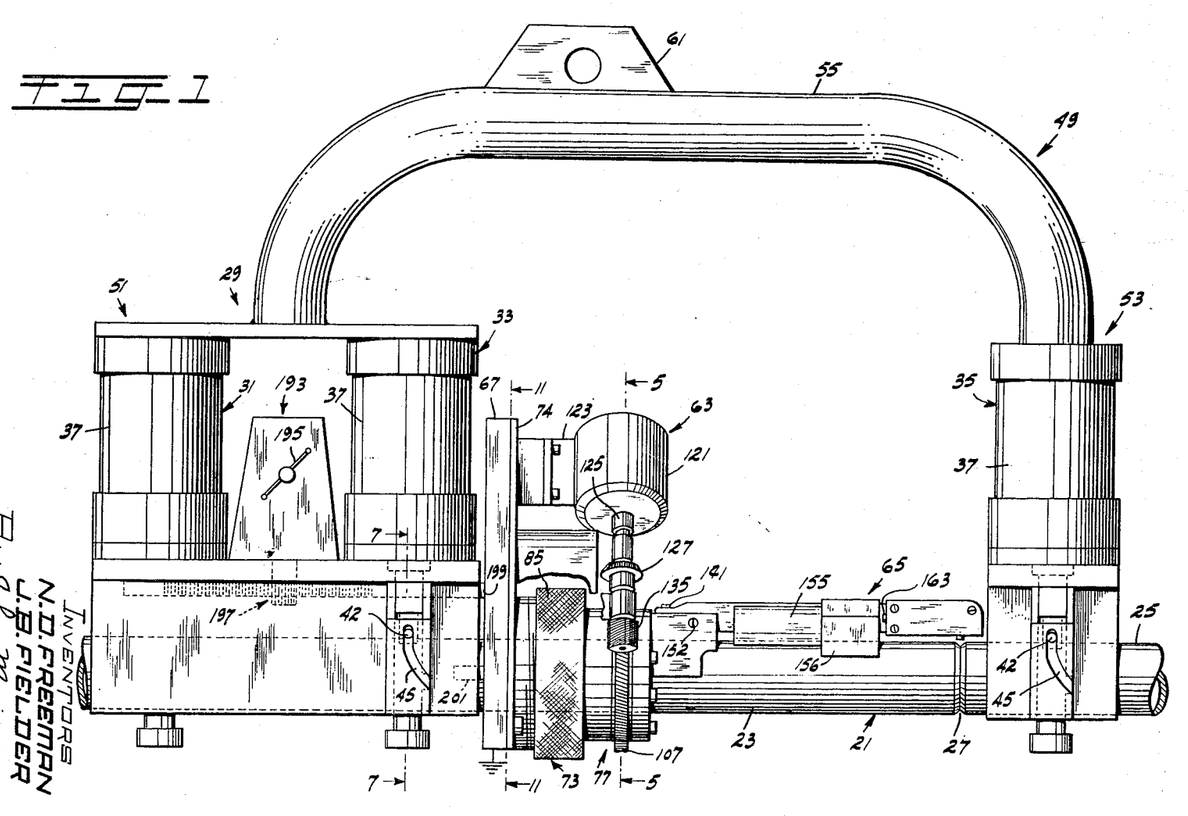
FIGURE 1 is a side elevation of the apparatus in accordance with this invention.

Referring now to the drawings and more particularly to FIGURE 1, a tubular workpiece 21 is shown in a horizontal position. The apparatus in accordance with this invention, however, can be used with the tubular workpiece 21 in any position. The tubular workpiece 21 is formed from two end portions 23, 25 which are axially aligned to form a joint 27 for welding. The apparatus straddles both portions 23, 25 of the tubular workpiece 21 to be welded and is clamped by clamping assemblies 29. Preferably three clamping assemblies 29 are utilized; namely, a left outside assembly 31, a left inside assembly 33, and a right assembly 35. The right assembly 35 is used to secure the apparatus to the right portion 25 of the tubular workpiece 21 and the two left assemblies 31, 33 are used to secure the apparatus to the left portion 23 of the tubular workpiece 21 and to align the entire apparatus with the tubular workpiece 21.

Figure 7:
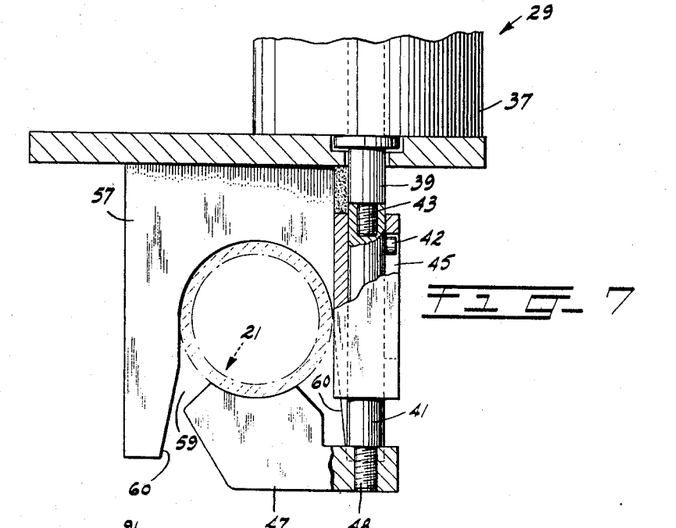
FIGURE 7 is a cross-sectional view along line 7—7 of FIG. 1.

Each clamping assembly 29 is the same, the details of which can best be seen in FIGURE 7. Each assembly 29 has a double acting air cylinder 37 on its upper end. A piston rod 39 extends from each air cylinder 37 and moves in and out depending upon the side of the cylinder 37 to which air is supplied. An extension shaft 41 is axially connected to the piston rod 39 by means of a thread 43 on the piston rod 39. Located on the side of the extension shaft 41 is a cam follower 42. As the extension shaft 41 is extended outwardly from the air cylinder 37, the cam follower 42 is guided by a cam groove 45 causing the extension shaft 41 and piston rod 39 to rotate. A clamp 47 is rigidly attached to the outer end of the extension shaft 41 by a threaded connection 48. As the extension shaft 41 is extended outwardly from the air cylinder 37, the cam follower 42 is guided by a cam groove 45 (FIGURES 1 and 7) causing the extension 41 and the piston rod 39 to rotate ninety degrees during the entire outward travel. With the piston rod 39 extending outward from the cylinders 37 the maximum amount, each clamp 47 is longitudinally aligned with the axis of the tubular workpiece 21 permitting the apparatus to be placed on the tubular workpiece 21. Air is then supplied to the air cylinders 37 to move the clamps 47 upwardly causing them to rotate ninety degrees so as to be aligned across the tubular workpiece 21 for clamping. The clamps 47 then continue to move upwardly still further to clamp directly against the tubular workpiece 21.

The three clamping assemblies 29 are mounted on a frame 49. The frame 49 includes a left portion 51 on which the two left clamping assemblies 31, 33 are mounted and a right portion 53 on which the right assembly 35 is mounted. The two portions 51, 53 of the frame 49 are rigidly connected by a handle 55 which has the frame portion 51 connected to one end and the frame portion 53 connected to the other end. Each clamping assembly 29 includes a holder 57 (FIGURE 7) with an opening or slot 59 into which the tubular workpiece 21 fit. The lower edge 60 of the slot 59 flares outwardly to assist in readily placing the holder 57 over the tubular workpiece 21.

Although not essential, a lifting lug 61 (FIGURE 1) may be placed on the top of the handle 55 for ease in supporting the apparatus such as by a crane. The handle 55 being hollow serves a dual function as both a portion of the frame 49 and, since it is hollow, it may be used as a container for pressurized air to actuate the clamping assemblies 29. This latter function of the handle 55 is particularly advantageous in field use so that only a small compressor need be brought along besides the electric power supply referred to hereinafter. As should be readily understood, all three air cylinders 29 would be actuated by a single pneumatic source (not shown), but the two left clamping assemblies 31, 33 would have one air valve (not shown) and the right clamping assembly 35 would have a separate air valve (not shown).

Figure 11:
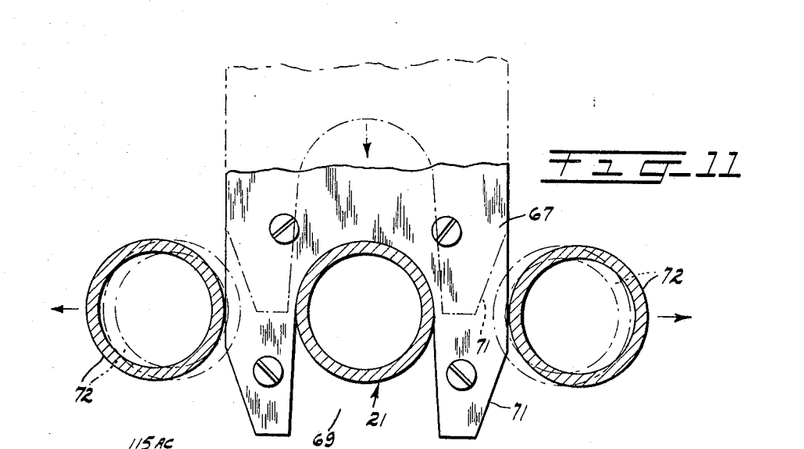
FIGURE 11 is a cross-sectional view along line 11—11 of FIG. 1.

On the inner side of the left portion 51 of the frame 49 is a drive assembly 63. Extending from the drive assembly 63 is a welding assembly 65 which lies close to and parallel with the tubular workpiece 21 to be welded. The welding assembly 65 is generally elongated in shape and includes an elongated arm or member 66. The drive assembly 63 is mounted on a plate 67 (FIGURES 1, 2 and 11) which is part of the frame 49. The plate 67, which has a slot 69 therein to fit around the tubular workpiece 21, has outer edges 71 which may taper outwardly and upwardly as a wedge. This wedge configuration is useful in spreading contiguous tubes 72 away from the tubular workpiece 21 being welded to provide an increase in working space as shown in FIGURE 11.

Figure 5:
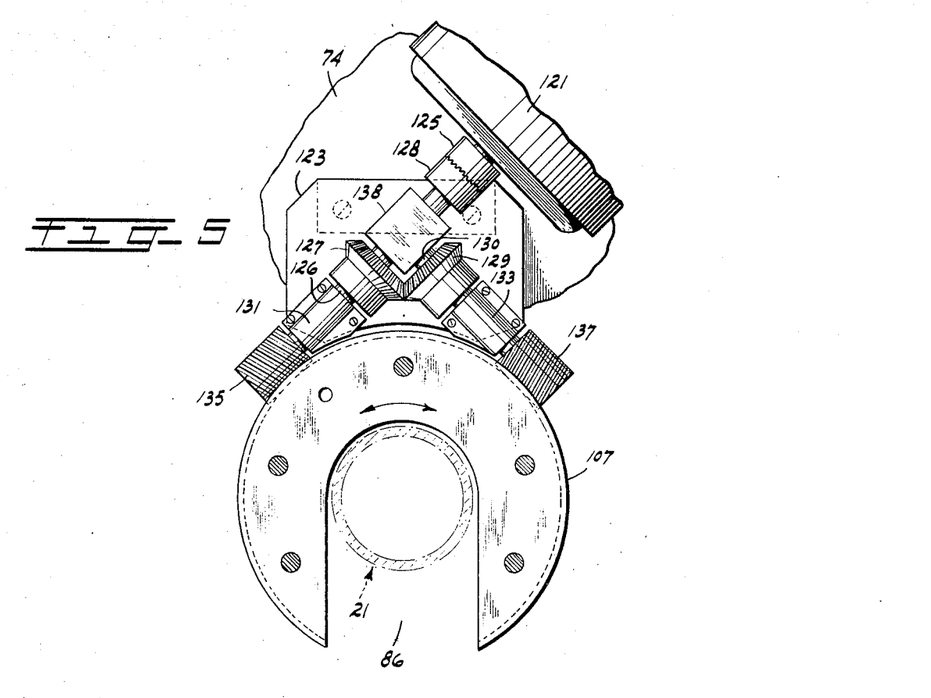
FIGURE 5 is a cross-sectional view along line 5—5 of FIG. 1.
Figures 8, 10:
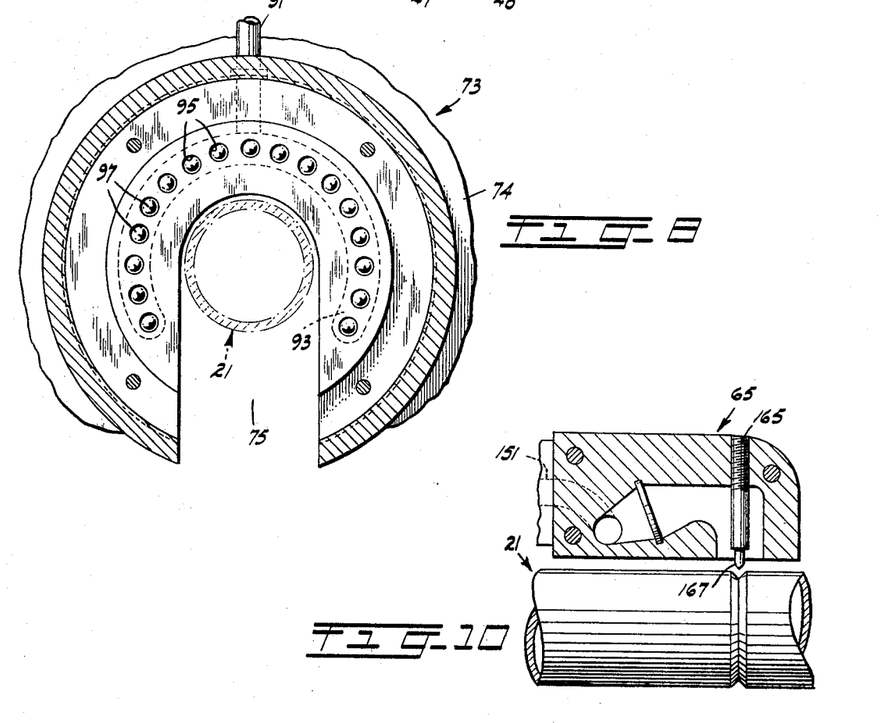
FIGURE 8 is a cross-sectional view along line 8—8 of FIG. 2.
FIGURE 10 is a cross-sectional view of a portion of the welding assembly showing a separate embodiment of the electrode.

A greater understanding of the drive assembly 63 can be had by referring to FIGURES 1, 2 and 5. Rigidly secured to the plate 67 of the frame 49 (FIGURE 2) is a stationary assembly 73 of cylindrical shape with a U-shaped opening or slot 75 therein (FIGURE 8). The opening 75 which extends along the longitudinal length is essential so that the stationary assembly 73 can be fitted over the tubular workpiece 21 to be welded. From the outer edge of the stationary assembly 73, the slot 75 extends inwardly to beyond the center line of the stationary assembly 73. Between the stationary assembly 73 and the plate 67 which is grounded is an electrical insulation sheet 74. The stationary assembly 73 is secured to the plate 67 by means of insulated bolts 76. The holders 57 rest against the tubular workpiece 21, thereby maintaining the stationary assembly 73 slightly off the tubular workpiece 21.

Rubbing face to face with the stationary assembly 73 is a rotatable assembly 77 which also has a U-shaped opening or slot 86 (FIGURE 5) similar to the slot 75 and which is also cylindrical. The rotatable assembly 77 includes a rotatable member 78 (FIGURE 9), preferably made of oil impregnated bronze, which has a slightly recessed face 79 into which the stationary assembly 73 fits. The rotatable member 78 also has extending lips 81 formed by a recessed external diameter 83. In this way, the rotatable member 78 along with the entire rotatable assembly 77 can be fitted against the stationary assembly 73 and a collar 85 screwed down on the extending lips 81 formed by the recessed diameter 83 to hold the rotatable member 78 against the stationary assembly 73. The collar 85 also includes the opening 86 (FIGURE 9) as it becomes rigidly attached to the stationary assembly 73. A series of spring-loaded pressure brushes 89, preferably four, are located in a groove 90 within the collar 85. The brushes 89 which are spring-loaded, are forced against the extending lip 81 of the rotatable member 78 to assure electrical continuity between the stationary assembly 73 and the rotatable member 78 for reasons concerning the electrical circuitry to be explained hereinafter.

The stationary assembly 73 has an inlet port 91 for shielding gas which feeds into a generally inner circumferential channel 93 (FIGURE 2) formed within the stationary assembly 73. Within the stationary assembly 73 are a series of passages 95 (FIGURES 2 and 8) which extend in the direction of the axis of the tubes 21. Each passage 95 has a spring-loaded ball valve 97 situated in it. The rotatable member 78 (FIGURE 9) has an inner circumferential channel 98 similar to the channel 93. The channel 98 is located on the face of the rotatable member 78 farthest removed from the stationary assembly 73. Passages 99 are located in the rotatable member 78 and are aligned on a common radius with the passages 95 of the stationary assembly 73. The passages 99 communicate with the inner circumferential channel 98. Spring-loaded ball valves 101 are also located in the passages 99 of the rotatable member 78. The valves 101 are directed in the opposite direction to the valves 97 so that the ball valves 97, 101 press against each other at the contacting faces of the stationary assembly 73 and the rotating member 78, when the respective passages 95, 99 are aligned thereby permitting communication through the passages 95, 99. Both sets of gas passages 95, 99 are located equidistant from the center line of the tubular workpiece 21 to be welded so that as the rotatable member 78 rotates in relation to the stationary assembly 73 at least some of the various passages 95, 99 are always aligned. By using at least eight passages 95, 99 in both the stationary assembly 73 and the rotatable member 78, it is assured that an adequate number will always be aligned during operation to assure a sufficient supply of shielding gas. The opposing valves 97, 101 assure a gas-tight seal between the stationary assembly 73 and rotatable member 78 regardless of the position of the slots 75, 86. When due to rotation, one of the passages 99 located in the rotatable assembly 77 reaches the slot 75 formed in the stationary assembly 73, no gas is permitted to escape since the respective spring-loaded ball valve 101 immediately closes the passage 99. Similarly when a passage 95 in the stationary assembly 73 is exposed by the location of the slot 86 of the rotatable assembly 77, the passage 95 is closed by one of the spring-loaded ball valves 97. However, as was previously pointed out and as is shown in FIGURE 2 when a passage 95 and a passage 99 are aligned the spring-loaded ball valves 97, 101 press against each other to force each other open.

The outside face 102 of the rotatable member 78 in which is located the inner circumferential channel 98 is sealed by a facing disc 103. The facing disc 103, of course, is also part of the rotatable assembly 77. A ring gear 107 is secured to the rotatable assembly 77 with an insulation disc 109 located between the facing disc 103 and the ring gear 107. On the opposite side of the ringe gear 107 within the rotatable assembly 77 is another insulation disc 111 and on the outside of the insulation 111 is a face plate 113. Extending along the tubular workpiece 21 from the face plate 113 and also part of the rotational assembly 77 is an arm support saddle 115 on which the welding assembly 65 is mounted. Bolts 117 secure the rotatable assembly 77 together and are partially covered by insulation sleeves 119 in the general proximity of the ring gear 107 to prevent the bolts from conducting electricity from the rotatable member 78 to the ring gear 107. The various subassemblies 78, 103, 107, 111, 113 of the rotatable assembly 77 must be assembled in proper alignment due to a series of interlocking grooves and ridges in the contacting faces as illustrated in FIGURE 2.

As best seen in FIGURES 1 and 5, an electric motor 121 is mounted on the plate 67 of the frame 49 by means of a bracket 123. The plate 67 is also insulated from the bracket by the insulation sheet 74. The shaft 125 of the motor 121 drives a first shaft 126 on which is mounted a first bevel gear 127 (FIGURE 5) which meshes with a second bevel gear 129 mounted on a second shaft 130. The first shaft 126 is mounted within a journal 131, and the second shaft 130 is mounted within a journal 133. Both journals 131, 133 are secured to the bracket 123. The first shaft 126 is isolated electrically from the motor shaft 125 by means of an insulated coupling 128, thereby electrically isolating the second shaft 130 as well as the ring gear 107 from the electric motor 121. The first shaft 126 extends from the first bevel gear 127 and has a first worm gear 135 on its opposite end. The shaft 130 which extends from the second bevel gear 129 has a worm gear 137 on its oppoiste end. Both worm gears 135, 137 mesh with the ring gear 107 and are separate from one another on the periphery of the ring gear so that at least one of the worm gears 135, 137 is always in contact with the ring gear 107 regardless of the location of the opening 86 in the gear 107. The first shaft 126 between the first bevel gear 127 and the coupling 128 passes through an upper journal 138 in which the free end of the second shaft 130 is mounted.

As has been previously pointed out, the welding assembly 65 (FIGURE 3) is mounted on the arm support saddle 115 which also fits about the tubular workpiece 21 and rotates with the ring gear 107. As can best be seen in FIGURE 2 the welding assembly 65 is retained in the arm support saddle 115 by a cored spindle 139 which is fitted into an opening 140 in the arm support saddle 115 and traverse to the welding assembly 65. This permits the welding assembly 65 to be adjusted as to electrode distance from the tubular workpiece 21 by rotating the welding assembly 65 about the spindle 139 with a set screw 141 which counterbalances against a spring 143 on the opposite side of the cored spindle 139. A passageway 145 (FIGURE 3) is provided from the inner circumferential channel 98 through the remaining subassemblies of the rotational assembly 77 and the arm support saddle 115 and into the inside of the cored spindle 139 through a first opening 147 in the cored spindle 139. The cored spindle 139 has a second opening 149 therein in communication with a passageway 151 through the welding assembly 65. The passageway 51 extends from the second opening 149 to near the opposite end of the welding assembly 65. The welding arm is made in two longitudinal halves (not shown) bolted together in order to form the gas passageway 151. A plug 152 in the opening 140 prevents the discharge of shielding gas.

Figure 3:
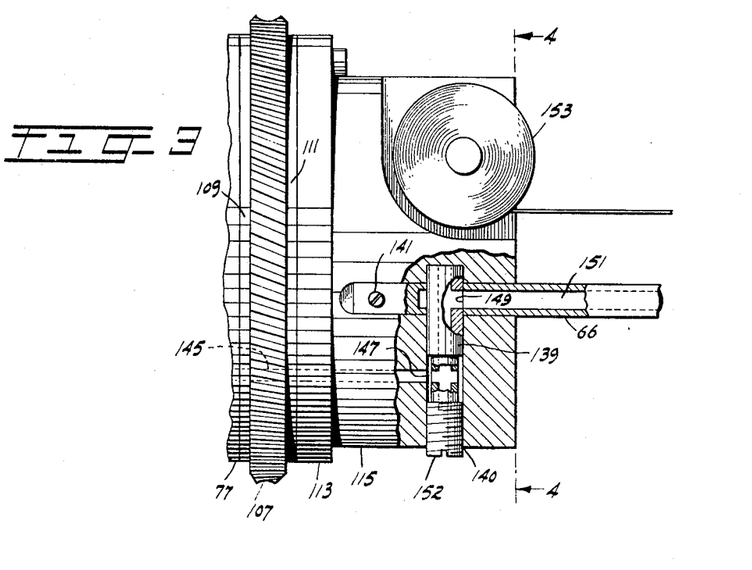
FIGURE 3 is a partial cross-sectional view along line 3—3 of FIG. 2.
Figure 4:
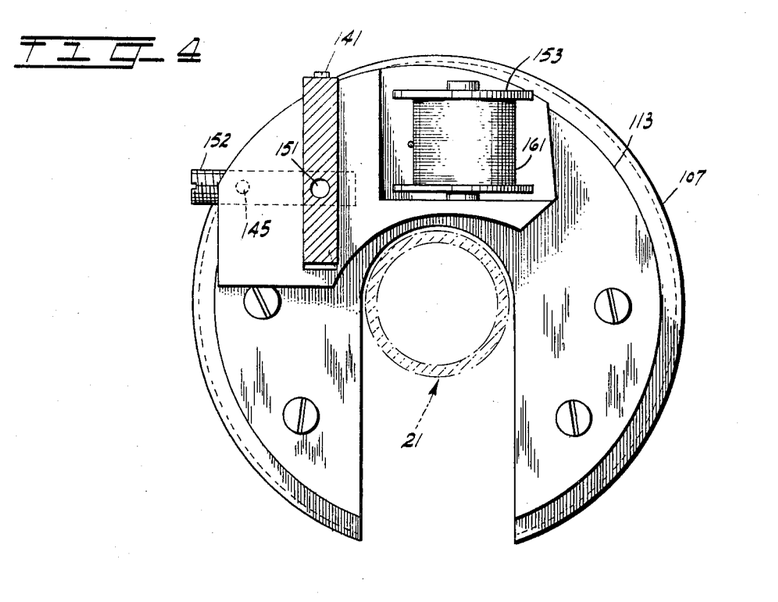
FIGURE 4 is a cross-sectional view along line 4—4 of FIG. 3.
Figure 6:
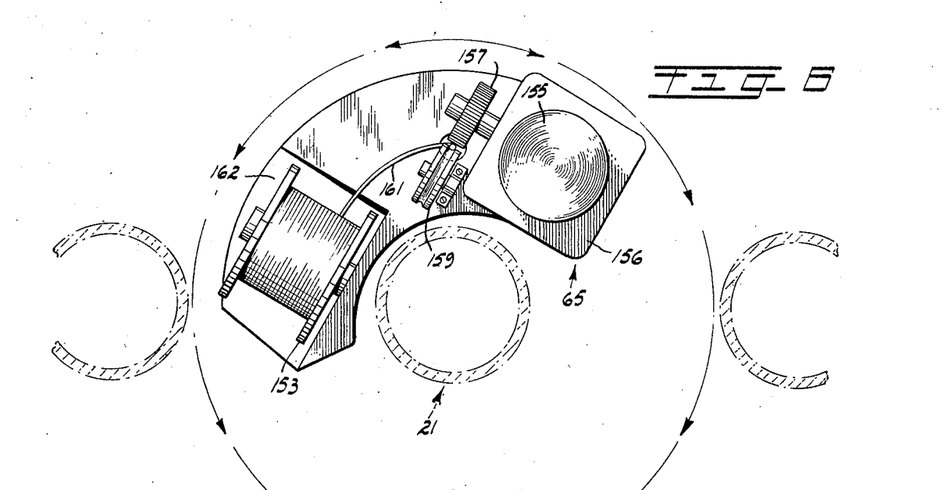
FIGURE 6 is a schematic view of the wire drive assembly with the wire reel displaced so as to show its relationship with the wire drive mechanism.

As shown in FIGURES 3, 4 and 6 and wire drive motor 155 is mounted on the welding assembly 65. As best shown in FIGURE 6, the wire drive motor 155 is clamped in a holder 156 and secured in any suitable manner as part of the welding assembly 65 to permit passage between two adjacent tubes. A wire drive gear 157 and roller 159 are located adjacent and are actuated by the wire drive motor 155. The wire reel 153 which contains a limited supply of wire 161 is secured to the arm support saddle 115 in an indentation 162 provided for it. The welding wire 161 is pulled off the reel 153 by the wire drive gear 157 and roller 159 and fed into a wire holder in the form of a guide tube 163 (FIGURE 2). The wire guide tube 163 is inserted between the two halves of the welding assembly 65. As best seen in FIGURE 2, the guide tube 163 directs the wire 161 radially into the tubular workpiece 21. The shielding gas is discharged from the passage 151 directly adjacent the end of the wire guide tube 163.

In FIGURE 10 is shown a separate embodiment for use with a non-consumable electrode 167 such as tungsten, rather than the consumable wire electrode 161 previously discussed. The welding assembly 65 as previously described remains, in general, the same, particularly as to the passage 151 for supplying shielding gas to the welding arc. However, a collet 165 is threaded into the welding arm at the outside end. The collet 165 is directed radially inward toward the tubular workpiece 21. The collet 165 serves to hold the non-consumable electrode 167 in place.

Figure 12:
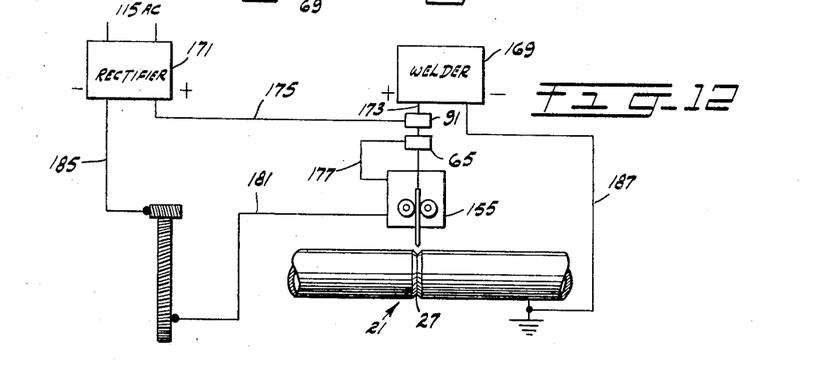
FIGURE 12 is a schematic view of the electrical circuit of both the welding arc and wire drive motor utilized with this invention.

FIGURE 12 shows schematically the wiring arrangement for supplying electrical energy for both the welding arc and the wire drive motor 155 where a consumable electrode is utilized. In the embodiment of FIGURE 10 where no wire drive motor 155 is required, the electrical circuitry would be similar to that shown in FIGURE 12 but with connections eliminated as hereinafter described that are required for the wire drive motor 155. Electrical energy for the welding arc is obtained from a standard welding power supply 169 such as a motor generator or rectifier. Electrical energy for the wire drive motor 155 is supplied through a wire drive motor speed control 171. A positive or negative lead 173 from the welder supply 169 and a positive or negative lead 175 from the motor control 171 are connected together to the gas inlet port 91 shown schematically in FIGURE 12 but shown physically in FIGURE 2. The gas inlet 91 is electrically as well as mechanically connected to the electrically conductive stationary assembly 73. The stationary assembly 73 and the rotatable member 78 of the rotatable assembly 77 retains electrical continuity with the stationary assembly 73 at their faces in sliding contact. The bolts 117 which have insulation sleeves 119 over a portion of their shanks as previously explained to prevent electrical contact with the ring gear 107, conduct the electrical energy supplied to the inlet port 91 from the rotatable member 78 through the remaining subassemblies of the rotatable assembly 77. Since the ring gear 107 has insulation discs 109, 111 on both sides of it and is prevented from electrical connection with the bolts 117 by the insulation sleeves 119, none of the electrical energy supplied to the inlet 91 enters the ring gear 107. As seen in FIGURE 3, the welding assembly 65 is electrically as well as mechanically connected to the rotatable assembly 77. Since the wire guide tube 163 is electrically conductive and is a part of the electrically conductive welding assembly 65 (shown schematically in FIGURE 12) electrical energy is readily supplied to the welding wire 161. Since the armature of the permanent field wire drive motor 155 is electrically insulated from the welding assembly 65, an electrical lead 177 can be connected from the welding assembly 65 to the positive or negative lead of the wire drive motor 155. The negative lead 179 of the wire drive motor 155 is connected to an electrical terminal 181 secured to the face plate 113 of the rotatable assembly 77. The electrical terminal 181 is insulated from the face plate 113 by a collar 183 but is electrically connected to the ring gear 107. A lead 185 connects, for example, the upper journal 138 to the contact of the motor control 171 completing the circuit for the wire drive motor 155. In this way, the ring gear 107 and the gears 135, 137 with the shafts 126, 130 serves as an electrical collector. The insulation sheet 74 and the insulation coupling 128 are used to prevent electrical power from the circuit being shorted through the frame 49. The circuit for the welding arc is completed by a lead 187 which connects the work piece 21 with the negative or positive terminal of the power supply 169. Of course alternating current as well as direct current with either straight or reverse polarity could be used in the same general arrangement.

The electrical rotational drive motor 121 is separately connected to an electrical power source (not shown) and requires no special connection as the motor 121 is stationary with respect to plate 67 and frame 49.

Figures 9, 13, 14:
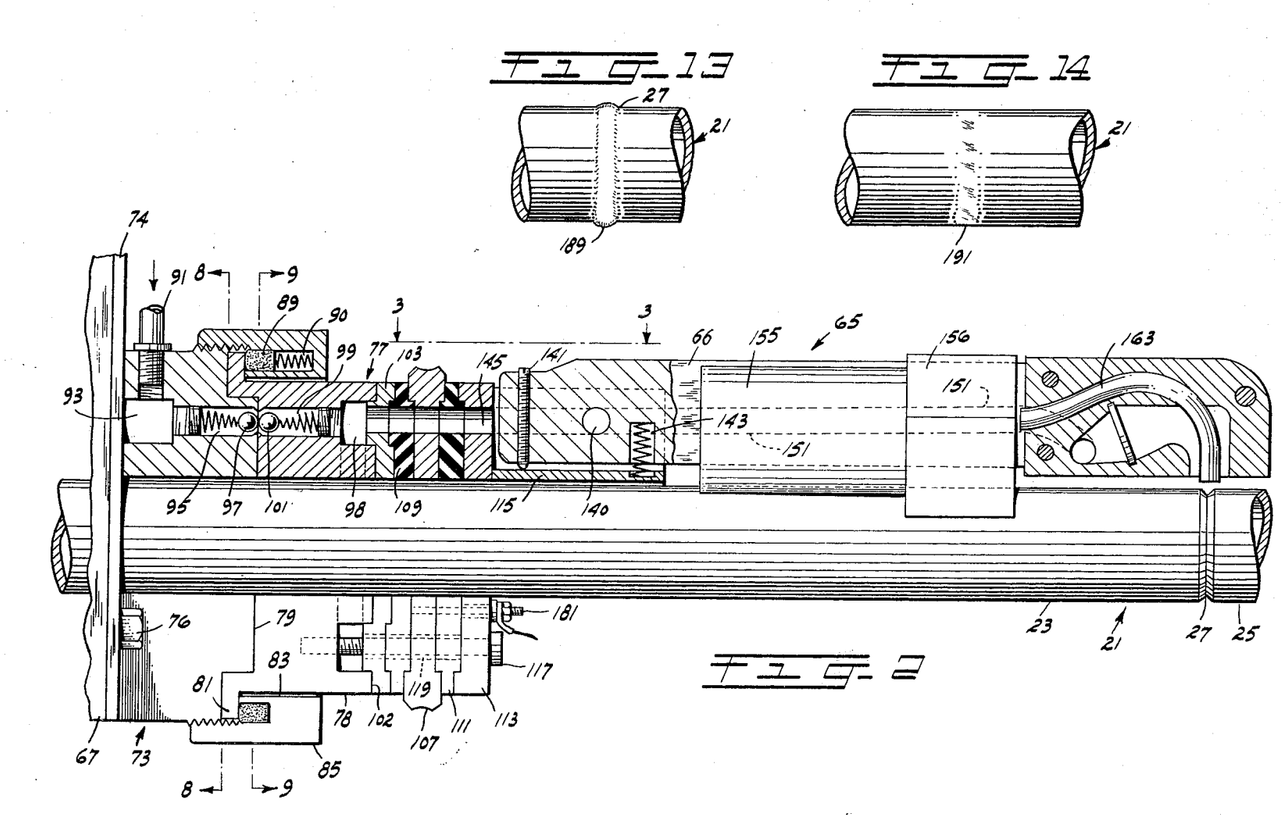
FIGURE 9 is a cross-sectional view along line 9—9 of FIG. 2.
FIGURE 13 is a side elevation of the end portions of two tubes welded together in accordance with this invention with the welding head intact.
FIGURE 14 is a side elevation similar to FIGURE 13 but with the welding bead removed.
Figure 9:
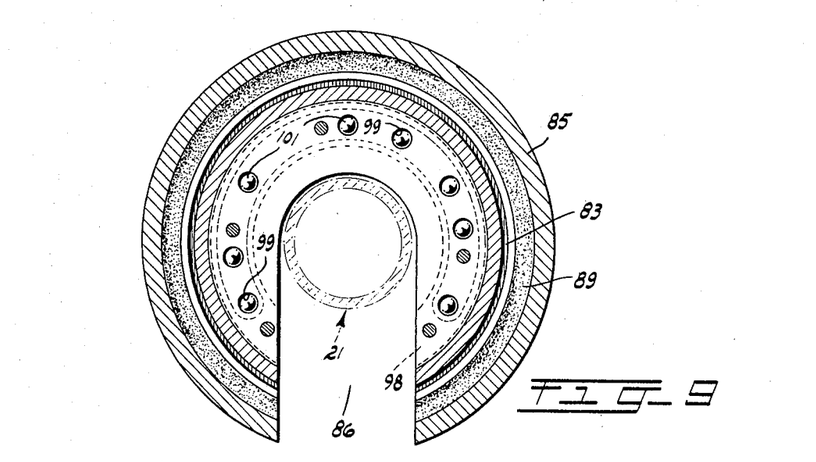

FIGURE 13 shows a completed weld 189 at the joint 27 of the tubular workpiece 21. In FIGURE 14 is shown a finished weld 191 which is achieved by grinding away the weld reinforcement of the weld 189.

Referring back to FIGURE 1, it will be noted that between the left outside clamping assembly 31 and the left inside clamping assembly 33 is an adjustment assembly 193 which is part of the frame assembly 49. The adjustment assembly 193 includes a handle 195 which operates a rack and pinion 197. The rack portion of the rack and pinion 197 also functions as a slide bar and is connected to the plate 67. A lower slide bar 201 provides added support. In this way, the drive assembly 63 and the welding assembly 65 can be positioned to properly locate the apparatus in relation to the joint 27.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and the scope of the invention as hereinafter claimed.

What is claimed is:

1. An apparatus for welding circumferential seams about a tubular workpiece comprising:

a support assembly having a slot therein from the outside to beyond the center line extending along the entire longitudinal length to permit said support assembly to fit over the tubular workpiece and to be held stationary with respect thereto, said stationary support assembly including an inlet means and a passage means connected to the inlet means for conveying shielding gas;

a rotatable support assembly rotatably mounted in association with said stationary support assembly, said rotatable support assembly having a slot therein from the outside to beyond the center line and extending along the entire longitudinal length to permit said rotatable support assembly also to fit over the tubular workpiece, said rotatable support assembly including passage means adapted to communicate with the passage means of said stationary support assembly;

a welding assembly means including an elongated member extending axially alongside the tubular workpiece and connected to said rotatable support assembly at one end and having an electrode means located at the other end which electrode means is directed radially toward the tubular workpiece, said elongated member having a passageway generally extending from the end connected to said rotatable support assembly to adjacent the electrode means, said passageway in said elongated member being connected to said passage means in said rotatable support assembly;

means to rotate said rotatable support assembly and said welding assembly about said tubes; and means for supplying electrical energy for a welding arc between said electrode means and the tubular workpiece.

2. An apparatus for welding circumferential seams according to claim 1 wherein:

said electrode means is a consumable electrode;

said welding assembly means includes a wire drive mechanism for driving said consumable electrode, said wire drive mechanism including an electric motor; and means for supplying electrical energy to said electric motor.

3. An apparatus for welding circumferential seams according to claim 1 wherein:

said electrode means is a consumable electrode;

said welding assembly means includes a wire drive mechanism for driving said consumable electrode, said wire drive mechanism including an electric motor;

said rotatable support assembly includes a ring gear which is electrically isolated from said rotatable welding assembly, said stationary support assembly and said rotatable support assembly being electrically conductive and in electrical contact with each other; and said means for supplying electrical energy for a welding arc between said electrode means and the tubular workpiece and said means for supplying electrical energy to said electric motor both include an electrical circuit means, said electrical circuit means including a first electrically conductive path which includes said stationary support assembly and extends from a source means of electrical energy to both said electric motor and to said consumable electrode, said electrical circuit means further including a second electrically conductive path from the workpiece to said source means, said electrical circuit still further including a third electrically conductive path which includes said ring gear and extends from said wire drive electric motor to said source means.

4. An apparatus for welding circumferential seams about a tubular workpiece comprising:

a frame means;

a stationary support assembly attached to said frame means, said stationary support assembly having a slot therein from the outside to beyond the center line extending along the entire longitudinal length of said stationary support assembly to permit said stationary support assembly to fit over the tubular workpiece, said stationary support assembly including an inlet port for shielding gas and an inner circumferentially-shaped channel in communication with the inlet port, a plurality of passageways extending axially from said inner circumferentially-shaped channel;

a rotatable support assembly including a ring gear rotatably mounted in association with said stationary support assembly, said rotatable support assembly having a slot therein from the outside to beyond the center line and extending along the entire longitudinal length of said rotatable support assembly to permit said rotatable support assembly to fit over the workpiece, said rotatable support assembly including a plurality of passageways extending axially from said stationary support member, said plurality of passageways in said stationary support assembly and said plurality of passageways in said rotatable support assembly being of sufficient number and location to maintain communication between at least one passageway in said stationary support assembly and one passageway in said stationary support assembly and one passageway in said rotatable support assembly regardless of the position of rotation of the rotatable support assembly, said rotatable support assembly further including an inner circumferentially-shaped channel at the end of said plurality of passageways remote from said stationary support assembly and an outlet extending therefrom;

a welding assembly means including an elongated member extending axially alongside the workpiece and connected to said rotatable support assembly at one end and having an electrode means located at the other end which electrode means is directed radially toward the tubes, said elongated member having a passageway generally extending from the end connected to said rotatable support assembly which is connected to the outlet of said rotatable support assembly;

drive means operatively associated with said ring gear to rotate said rotatable support assembly and said welding assembly about the workpiece; and means for supplying electrical energy for a welding arc between said electrode means and the tubular workpiece.

5. An apparatus for welding circumferential seams according to claim 4 wherein:

said electrode means in a consumable electrode;

said welding assembly means includes a wire drive mechanism for driving said consumable electrode, said wire drive mechanism including a wire drive electric motor;

said ring gear is electrically isolated from said rotatable welding assembly, said stationary support assembly and said rotatable support assembly being electrically conductive and in electrical contact with each other; and said apparatus further including a means for supplying electrical energy to said wire drive electric motor, said means for supplying electrical energy for said welding arc between said consumable electrode and the workpiece and said means for supplying electrical energy to said wire drive electric motor both including an electrical circuit means, said electrical circuit means including a first electrically conductive path which includes said stationary support assembly and extends from a source means of electrical energy to both said electric motor and to said consumable electrode, said electrical circuit means further including a second electrically conductive path from the workpiece to said source means, said electrical circuit means still further including a third electrically conductive path which includes said ring gear and extends from said wire drive electric motor to said source means.

6. An apparatus for welding circumferential seams about a tubular workpiece comprising:

a frame including a generally inverted U-shaped tubular member;

a first clamping assembly attached to said frame adjacent one end of said inverted U-shaped member and a second clamping assembly attached to said frame adjacent to the opposite end of said inverted U-shaped member to secure the tubular workpiece and to retain the tubular workpiece in alignment;

a stationary support assembly attached to said frame adjacent said first clamping assembly, said stationary support assembly having a slot therein from the outside to beyond the center line extending along the entire longitudinal length of said stationary support assembly to permit said stationary support assembly to fit over the tubes, said stationary support assembly including an inlet port for shielding gas and an inner circumferentially-shaped channel in communication with the inlet port, a plurality of passageways extending axially from said inner circumferentially-shaped channel;

a rotatable support assembly including a ring gear rotatably mounted in association with said stationary support assembly, said rotatable support assembly having a slot therein from the outside to beyond the center line and extending along the entire longitudinal length of said rotatable support assembly to permit said rotatable support assembly to fit over the tubes, said rotatable support assembly including a plurality of passageways extending axially from said stationary support assembly, said plurality of passageways in said stationary support assembly and said plurality of passageways in said rotatable support assembly being of sufficient number and location to maintain communication between at least one passageway in said stationary support assembly and one passageway in said rotatable support assembly regardless of the position of rotation of the rotatable support assembly, said rotatable support assembly further including an inner circumferentially-shaped channel at the end of said plurality of passageways remote from said stationary support assembly and an outlet extending therefrom;

a welding assembly means including an elongated member extending axially alongside the abutting tubes and connected to said rotatable support assembly at one end and having an electrode means located at the other end which electrode means is directed radially toward the tubes, said elongated member having a passageway generally extending from the end connected to said rotatable support assembly to adjacent the electrode means, said passageway in said elongated member being connected to said outlet in said rotatable support assembly;

drive means including an electric motor operatively associated with said ring gear to rotate said rotatable support assembly and said welding assembly about said tubes; and means for supplying electrical energy for welding arc between said electrode means and the tubular workpiece.

7. An apparatus for welding circumferential seams according to claim 6 wherein said drive means further includes:

a primary shaft extending from said electric motor;

a first bevel gear mounted on said drive shaft;

a first pinion mounted on the end of said drive shaft remote from said motor, said first bevel gear being located intermediate said first pinion and said electric motor, said first pinion gear being operatively associated with said ring gear;

a secondary drive shaft located at an angle with said primary drive shaft in a plane common with the main plane of said ring gear;

a second bevel gear in a meshing relationship with said first bevel gear and mounted on said secondary drive shaft; and a second pinion mounted on the end of said secondary drive shaft and operatively associated with said ring gear, said first pinion and said second pinion being sufficiently spaced apart that at least one of them is always in meshing contact with said ring gear regardless of the position of said slot in said rotatable support assembly.

8. An apparatus for welding circumferential seams according to claim 6 wherein said first clamping assembly includes two pneumatically operated clamps for retaining the tubes against the frame and said second clamping assembly includes one pneumaically operated clamp for retaining the tubes against the frame.

9. An apparatus for welding circumferential seams according to claim 6 wherein said electrode means is a consumable electrode and said welding assembly includes a wire drive mechanism connected to a wire drive electric motor for driving said wire drive mechanism and feeding said consumable electrode and said apparatus further including means for supplying electrical energy to said wire drive electric motor.

10. An apparatus for welding circumferential seams according to claim 6 wherein said electrode means is a non-consumable electrode.

11. An apparatus for welding circumferential seams about a tubular workpiece comprising:

a frame means;

a stationary support assembly attached to said frame means, said stationary support assembly having a slot therein from the outside to beyond the center line extending along the entire longitudinal length of said stationary support assembly to permit said stationary support assembly to fit over a workpiece, said stationary support assembly including an inlet port for shielding gas and an inner circumferentially-shaped channel in communication with the inlet port, a plurality of passageways extending axially from said inner circumferentially-shaped channel, valve means being located in said plurality of passageways in said stationary support assembly;

a rotatable support assembly rotatably mounted in association with said stationary support assembly, said rotatable support assembly having a slot therein from the outside to beyond the center line and extending along the entire longitudinal length of said rotatable support assembly to permit said rotatable support assembly to fit over the tubular workpiece, said rotatable support assembly including a plurality of passageways extending axially from said stationary support member, said plurality of passageways in said stationary support assembly and said plurality of passageways in said rotatable support assembly being of sufficeint number and location to maintain communication between at least one passageway in said stationary support assembly and one passageway in said rotatable support assembly regardless of the position of rotation of the rotatable support assembly, said rotatable support assembly further including an inner circumferentially-shaped channel at the end of said plurality of passageways remote from said stationary support assembly and an outlet extending therefrom, valve means being located in said plurality of passageways in said rotatable support assembly, said valve means in said stationary support assembly and said valve means in said rotatable support assembly being adapted to open their respective passageways when said respective passageways are in communication and to close their respective passageways to avoid leakage when exposed due to the position of rotation of said rotatable support assembly;

a welding assembly means including an elongated member extending axially alongside the tubular workpiece and connected to said rotatable support assembly at one end and having a consumable-electrode guide means located at the other end which consumable-electrode guide means is directed radially toward the tubular workpiece, said elongated member having a passageway generally extending from the end connected to said rotatable support assembly which is connected to the outlet of the rotatable support assembly, said welding assembly further including an electrode feeding electric motor and mechanism for supplying a consumable electrode through said consumable electrode guide means.

drive means operatively associated with said rotatable support assembly for rotating said rotatable support assembly;

means for supplying electrical energy for a welding arc between said consumable electrode and the tubular workpiece; and means for supplying electrical energy to said electrode feeding electric motor.

12. An apparatus for welding circumferential seams according to claim 11 wherein said valve means in said stationary support assembly and said valve means in said rotatable support assembly are spring-loaded ball valves, said springloaded ball valves in said stationary support assembly being opposed to said spring-loaded ball valves in said rotatable support assembly.

13. An apparatus for welding circumferential seams according to claim 12 wherein:

said rotatable support assembly includes a ring gear which electrically isolated from said rotatable welding assembly, said stationary support assembly and said rotatable support assembly being electrically conductive and in electrical contact with each other; and said means for supplying electrical energy for the welding arc between said consumable electrode and the tubular workpiece and said means for supplying electrical energy to said electrode feeding electric motor both include an electrical circuit means for electrically energizing both said electric wire drive electric motor and a welding arc between the consumable electrode and the workpiece, said electrical circuit means including a first electrically conductive path which includes said stationary support assembly and extends from a source means of electrical energy to both said electric motor and to said consumable electrode, said electrical circuit means further including a second electrically conductive path from the tubular workpiece to said source means, said electrical circuit means still further including a third electrically conductive path which includes said ring gear and extends from said wire drive electric motor to said source means.

14. An apparatus for welding circumferential seams according to claim 13 which includes a first clamping assembly and a second clamping assembly attached to said frame to secure the tubular workpiece and to retain the tubular workpiece in alignment.

15. The apparatus defined in claim 1 wherein said rotatable support assembly has a ring gear, said slot being in such ring gear, said ring gear being connected with said welding assembly and mounted for rotation about the axis of said tubular workpiece with said workpiece positioned within said slot, said means to rotate said rotatable support assembly comprising two worm gears meshing with said ring gear at the upper portion thereof so that neither of said worm gears laterally project appreciably beyond the sides of said ring gear, and a motor to drive said two worm gears mounted above said worm gears so that said motor does not extend laterally beyond said gear at a height below the top of said ring gear.

References Cited

UNITED STATES PATENTS

| | | | |
|---|---|---|---|
| 2,721,248 | 10/1955 | Kirkpatrick | 219—125 |
| 3,134,894 | 5/1964 | Farnsworth | 219—125 |
| 3,179,781 | 4/1965 | Ross et al. | 219—60.1 |
| 3,194,937 | 7/1965 | Brons et al. | 219—60.1 |
| 3,230,340 | 1/1966 | Glatthorn et al. | 219—60.1 X |
| 3,395,262 | 7/1968 | Kazlauskas | 219—125 X |

ANTHONY BARTIS, Primary Examiner

L. A. SCHUTZMAN, Assistant Examiner

U.S. Cl. X.R.

219—125; 228—29

UNITED STATES PATENT OFFICE
CERTIFICATE OF CORRECTION

Patent No. 3,509,302                                April 28, 1970

John Bunnell Fielder et al.

It is certified that error appears in the above identified patent and that said Letters Patent are hereby corrected as shown below:

Column 2, line 38, "hqad" should read -- head --. Column 5, line 59, "51" should read -- 151 --. Column 7, line 50, "suppor" should read -- support --. Column 8, line 60, cancel "one passageway in said stationary support assembly"; line 61, cancel "and".

Signed and sealed this 6th day of April 1971.

(SEAL)
Attest:

EDWARD M.FLETCHER,JR.                        WILLIAM E. SCHUYLER, JR.
Attesting Officer                              Commissioner of Patents